United States Patent
Shi et al.

(10) Patent No.: US 9,866,331 B1
(45) Date of Patent: Jan. 9, 2018

(54) OPTICAL MODULE

(71) Applicants: Hisense Broadband Multimedia Technologies Co., Ltd., Qingdao, Shandong (CN); Hisense Broadband Multimedia Technologies, Ltd., Tortola (VG)

(72) Inventors: Liang Shi, Qingdao (CN); Yuna Zhang, Qingdao (CN); Zhendong Li, Qingdao (CN)

(73) Assignees: Hisense Broadband Multimedia Technologies Co., Ltd., Qingdao, Shandong (CN); Hisense Broadband Multimedia Technologies, Ltd., Tortola (VG)

( * ) Notice: Subject to any disclaimer, the term of this patent is extended or adjusted under 35 U.S.C. 154(b) by 0 days.

(21) Appl. No.: 15/394,161

(22) Filed: Dec. 29, 2016

(30) Foreign Application Priority Data

Jun. 16, 2016 (CN) .......................... 2016 1 0431520

(51) Int. Cl.
*H04B 10/06* (2006.01)
*H04B 10/60* (2013.01)
*H04B 10/27* (2013.01)
*H04J 3/16* (2006.01)

(52) U.S. Cl.
CPC ............. *H04B 10/60* (2013.01); *H04B 10/27* (2013.01); *H04J 3/1652* (2013.01)

(58) Field of Classification Search
CPC ...... H04B 10/60; H04B 10/616; H04B 10/64; H04B 10/66; H04B 10/69; H04B 10/691; H04B 10/695; H04B 10/27; H04J 3/1652
USPC .................................................. 398/202, 208
See application file for complete search history.

(56) References Cited

U.S. PATENT DOCUMENTS

| | | | |
|---|---|---|---|
| 7,912,380 B2 * | 3/2011 | Uesaka .............. | H04B 10/0799 398/202 |
| 8,660,439 B2 * | 2/2014 | Kang ................... | H03G 3/3084 398/210 |

* cited by examiner

*Primary Examiner* — M. R. Sedighian
(74) *Attorney, Agent, or Firm* — Brinks Gilson & Lione

(57) ABSTRACT

An optical module is disclosed. According to one implementation, the optical module comprises an optical receiver, a diode, a first resistor, a first capacitor, a comparator, and a control chip. The diode anode connects electrically with a triggering signal output end of the optical receiving module, the cathode of the diode connects with one end of the first capacitor and one input end of the comparator. Another end of the first capacitor connects with the ground; the first resistor is connected in parallel with both ends of the first capacitor. A pre-set reference voltage is connected with another input end of the comparator. The optical receiver generates a first triggering signal in response to a burst mode optical signal. After inputting the first triggering signal into the diode anode, the comparator outputs a second triggering signal from the output end, triggering the control chip to generate a reset signal input into the optical receiver.

11 Claims, 4 Drawing Sheets

OPTICAL MODULE

CROSS REFERENCE TO RELATED APPLICATIONS

This application claims priority to Chinese Patent Application No. 201610431520.7, filed Jun. 16, 2016, the entire content of which is incorporated herein by reference.

TECHNICAL FIELD

The present disclosure relates to an optical module for optical communication.

BACKGROUND

Passive Optical Network (PON) is an optical access network, which may not have any active devices such as electronic equipment and an electronic power supply and so on. The PON system may mainly comprise an Optical Line Terminal (OLT), an Optical Distribution Network (ODN) and an Optical Network Unit (ONU). Where, the OLT may provide the access network with an interface between the network side and the core network, and may be connect to each ONU via an ODN. An ONU may provide an interface to the user side for the access network, which may provide multi-service flows such as voice, data, video etc. in accessing ODN.

SUMMARY

According to one aspect of the present disclosure, an optical module is provided. The optical module may comprise: an optical receiver configured to generate and output a first triggering signal in response to a receipt of a burst mode optical signal; a diode comprising an anode connected electrically with an output end of the optical receiver to receive the first triggering signal; a first capacitor comprising a first end connected electrically with a cathode of the diode and a second end connected with the ground; a first resistor connected between the two ends of the first capacitor; a comparator comprising a first input end connected electrically to a pre-set reference voltage, a second input end connected electrically with the cathode of the diode, and an output end for outputting a second triggering signal; and a control chip connected electrically with the optical receiver for generating a reset signal input into the optical receiver in response to a receipt of the second triggering signal.

The diode may be forward biased and in a conducting mode and thus charge the first capacitor through inputting the first triggering signal output from the optical receiver into the diode when the first triggering signal is at high electrical level. In such a case, when the voltage difference between the two ends of the first capacitor is larger than the reference voltage input into a second input end of the comparator, the output end of the comparator may output the second triggering signal at a high electrical level, which may trigger the control chip to generate the reset signal for the optical receiver. However, when the first triggering signal is at low electrical level, the diode cuts off and urges the first capacitor to discharge through the first resistor. In such a case, it may be ensured that the voltage difference between the two ends of the first capacitor remains larger than the reference voltage before the reset signal input into the optical receiver disappears, by setting an appropriate reference voltage and resistance of the first resistor, such that the second triggering signal output from the comparator may remain at high electrical level. Thus, the second triggering signal may hardly be influenced by the reset signal input into the optical receiver, such that the stability of the whole system may be improved effectively.

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Figure 1:
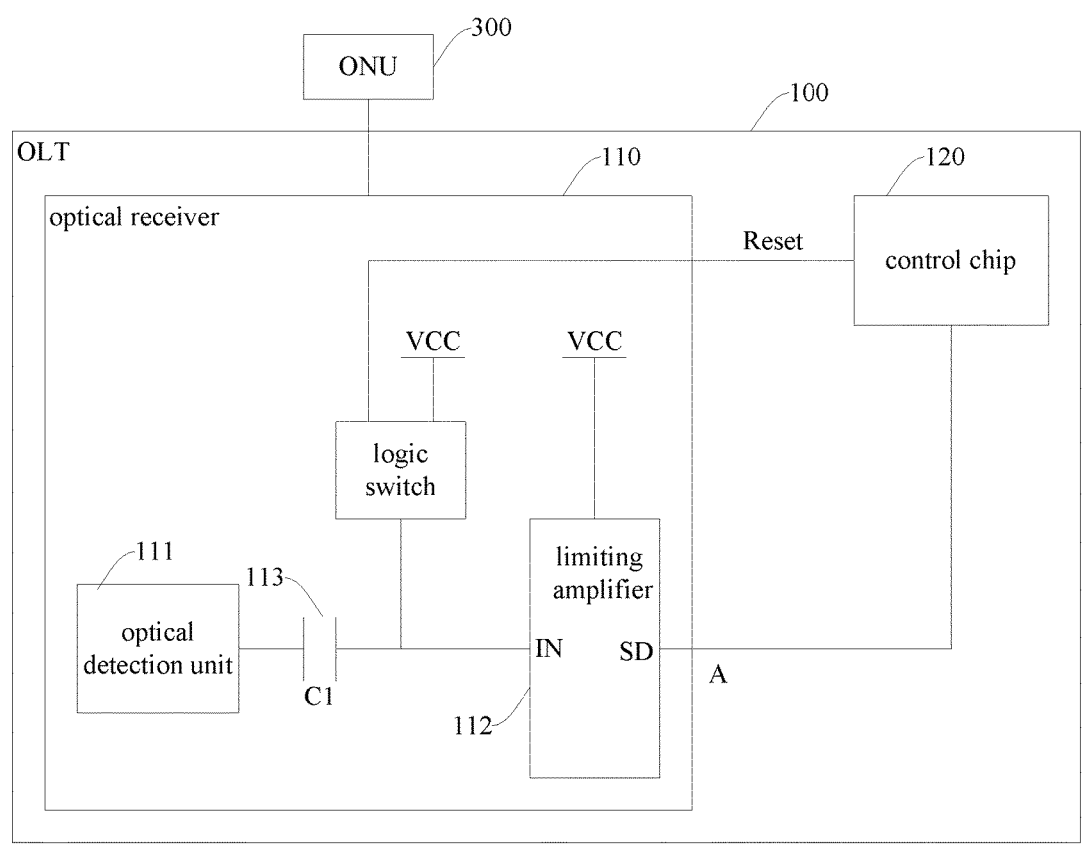
FIG. 1 is a structural view of the optical module.

With reference to FIG. 1, when OLT 100 is registered with ONU 300, an optical pulse signal with high frequency is input into an optical receiver 110 in the optical module of OLT 100 from ONU 300. The optical pulse signal may trigger the optical receiver 110 to output a triggering signal SD. The triggering signal SD is at high electrical level when an optical pulse is received, and is at low electrical level when not. In other words, the triggering signal SD is an indicating signal rapidly following the advent and disappearance of a burst optical signal received. When the triggering signal SD contains a rising edge from low to high, a control chip 120 is triggered to send a reset signal to the optical receiver 110. The reset signal, Reset, may discharge a coupling circuit 113 between an optical detection unit 111 and a limiting amplifier (LA) 112, such that the electrical signal input into the LA 112 from the optical detection unit 111 may recover rapidly. The coupling circuit 113, for example, may comprise a coupling capacitor C1.

However, the reset signal Reset may also trigger instability of the triggering signal SD. For example, the reset signal Reset may cause the triggering signal SD to turn to low electrical level from high electrical level. Thus, when the triggering signal SD contains a rising edge from low to high again, a control chip 120 will be triggered to send the reset signal Reset to the optical receiver 110 again and this circle may be repeated. In other words, the triggering signal SD output from the optical receiver of the optical module influenced by the reset signal Reset sent from the control chip 120 may possibly allow the instability of the triggering signal SD and even influence the normal registration of OLT with ONU.

Figure 2:
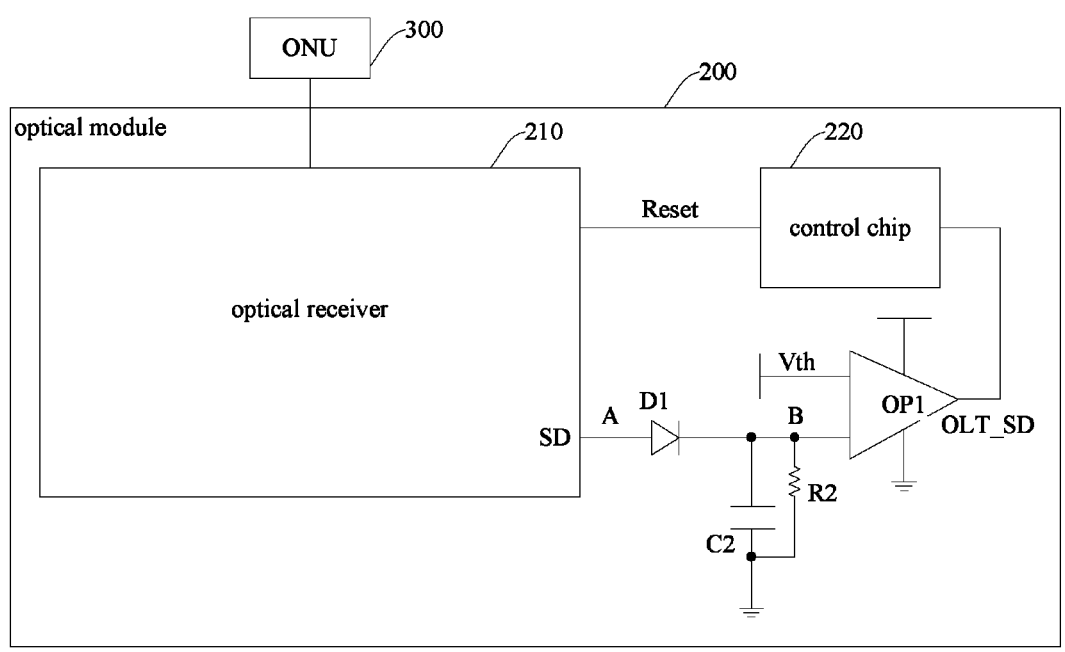
FIG. 2 is a structural view of an optical module according to an example of the present disclosure.

With reference to FIG. 2, an optical module is provided according to an example of the present disclosure. As shown in FIG. 2, an optical module 200 may comprise an optical receiver 210. The optical module 200 combined with a network unit ONU 300 may constitute a PON system. The optical receiver 210 may be configured to be controlled by a high frequency optical signal input from the network unit ONU 300. Normally, the frequency of the optical signal output from the ONU 300 may be up to 1.25 GHZ. A control chip 220 may also be configured to connect with the optical receiver 210 electrically. The electrical level variation of a first triggering signal SD output from the optical receiver 210 may be driven by the control chip 220 through inputting the reset signal Reset into the optical receiver 210. In one embodiment of the present disclosure, the control chip 220 may be a Medium Access Control (MAC) chip of the PON system.

When a burst optical signal input from the ONU 300 is detected by the optical receiver 210, the first triggering signal SD at a first electrical level may be output by the optical receiver 210. On the contrary, when a burst optical signal is not detected by the optical receiver 210, the first triggering signal SD at a second electrical level may be output by the optical receiver 210. In other words, the first triggering signal SD is an indicating signal rapidly following the advent and disappearance of a burst optical signal received. In one embodiment of the present disclosure, the first electrical level may be at high electrical level, the second electrical level may be at low electrical level. However, the present solution is not limited to the embodiment.

Further, the optical module may also comprise a diode D1, a first resistor R2, a first capacitor C2 and a comparator OP1. The anode of the diode D1, i.e. point A in FIG. 2, may be configured to be connected electrically with the triggering signal output end of the optical receiver 210 to input the first triggering signal SD output from the triggering signal output end into the diode D1. The cathode of the diode D1 may be configured to be connected with the first capacitor C2 accessed into the ground electrically. Both ends of the first capacitor C2 may be configured to be connected to the first resistor R2 such that the first capacitor C2 is in parallel with the first resistor R2. The first resistor R2 may be configured to provide the first capacitor C2 with a discharge path. A pre-set reference voltage Vth may be provided into a first input end of the comparator OP1. A non-ground end of the first capacitor C2 may be connected with a second input end of the comparator OP1 electrically, i.e. point B in FIG. 2.

Thus, the electrical level variation of a second triggering signal OLT_SD output from the output end of comparator OP1 is produced by the comparator OP1 by comparing the reference voltage Vth with the voltage across the two ends of the first capacitor C2 (hereinafter, "the voltage across two ends" may also be referred as "the voltage difference between two ends"), i.e. the voltage at point B in FIG. 2. Specifically, in one embodiment of the present disclosure, when the voltage at point B is higher than the reference voltage Vth, the second triggering signal OLT_SD output from the comparator OP1 may be at high electrical level. Instead, when the voltage at point B is lower than the reference voltage Vth, the second triggering signal OLT_SD output from the comparator OP1 may be at low electrical level.

Further, the output end of the comparator OP1 may be configured to be connected with the control chip 220 electrically. When a rising edge occurs in the second triggering signal OLT_SD, the control chip 220 may be triggered to output one pulse-like reset signal Reset to the optical receiver 210. And after the reset signal Reset is received by the optical receiver 210, the first triggering signal SD output from the triggering signal output end of the optical receiver 210 is triggered to be low electrical level from high electrical level.

Figure 4:
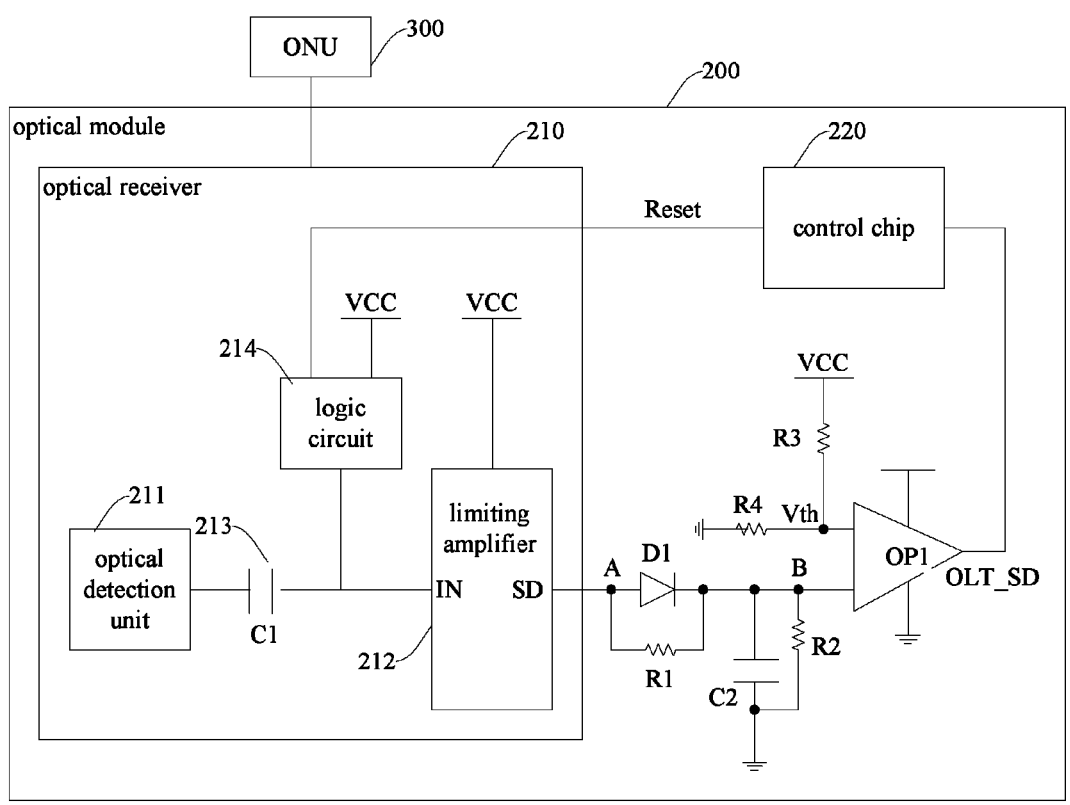
FIG. 4 is a structural view of an optical module according to another example of the present disclosure.

As shown in FIG. 4, in another embodiment of the present disclosure, the optical receiver 210 may comprise an optical detection unit 211, a coupling circuit 213 and a LA 212 connected electrically in series. The control chip 220 may input the reset signal Reset into the LA 212 so as to discharge the coupling circuit 213. The optical detection unit 211 may be a PIN photodiode and a trans-impedance amplifier (TIA) connected electrically with each other, or may be an avalanche diode. Under a certain operation bandwidth, a larger gain may be obtained by selecting the PIN photodiode and the trans-impedance amplifier TIA with a larger trans-impedance.

Further, in one exemplified embodiment of the present disclosure, the coupling circuit 213 may be the coupling capacitor C1. The LA 212 may be a limiting amplifier in burst mode.

Further, in one embodiment of the present disclosure, the optical receiver 210 may also comprise a logic circuit 214. In such case, the control chip 220 may input the reset signal Reset into the LA 212 through the logic circuit 214.

Figure 3:
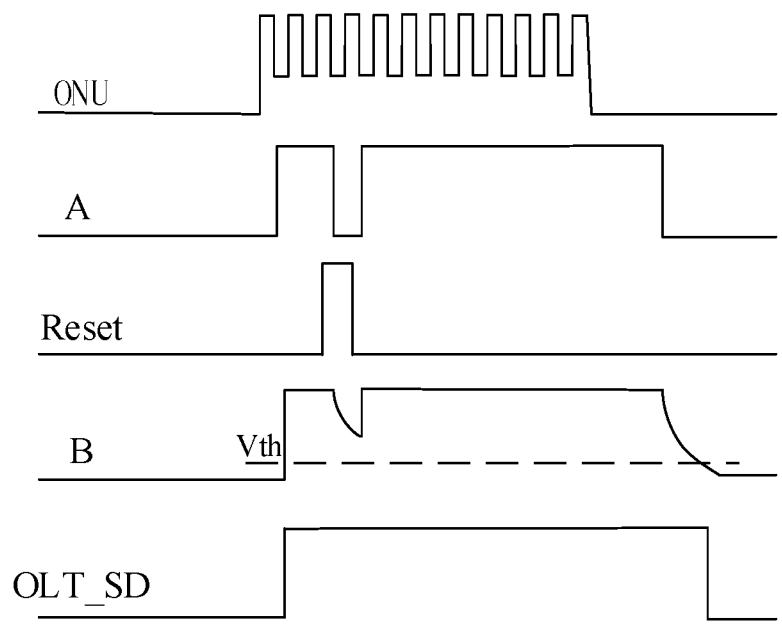
FIG. 3 is a signal timing diagram of an optical module according to an example of the present disclosure.

With reference to FIG. 3 and FIG. 4, when the optical signal in burst mode is sent to the optical receiver 210 by the optical network unit ONU 300, the first triggering signal SD, i.e. the electrical level at point A, may turn to high electrical level from low electrical level and the diode D1 may be allowed conduct. Since the internal resistance of the conducting (or positively biased) diode D1 is very small, the succeeding first capacitor C2 may be charged rapidly, such that the electrical level at point B may rise rapidly.

When the electrical level at point B is higher than the reference voltage Vth of the comparator OP1, the second triggering signal OLT_SD output from the output end of the comparator OP1 may turn to high electrical level from low electrical level.

The rising edge of the second triggering signal OLT_SD may trigger the control chip 220 to send the reset signal Reset, discharging the coupling capacitor C1 between the optical detection unit 211 and the LA 212, and further allowing the first triggering signal SD output from the optical receiver 210, i.e. the electrical level at point A, to turn to low electrical level from high electrical level.

The electrical level at point A turns to low electrical level from high electrical level, allowing the diode D1 to be reversely biased. In another embodiment of the present disclosure, as shown in FIG. 4, the diode D1 may connect in parallel with the second resistor R1 so as to control the discharging speed of the first capacitor C2 appropriately. For example, in case that the resistance of the second resistor R1 connected in parallel with the diode D1 is larger than the internal conduct resistance of the diode D1, the first capacitor C2 connected in parallel with the first resistor R2 may be allowed to discharge slowly as shown as by the slow signal drops in the waveform of FIG. 3 for point B in FIG. 4. Thus, the voltage at point B may remain larger than the reference voltage Vth though slow discharge of the first capacitor C2, as long as an appropriate reference voltage Vth and resistance of the first resistor R2 are set. As such, the second triggering signal output from the comparator OP1 may remain at high electrical level, as shown in FIG. 3.

As shown by the waveforms in FIG. 3, after the ending of the reset signal Reset, the first triggering signal SD output from the optical receiver 210, i.e. the electrical level at point A may turn to high electrical level from low electrical level and may allow the diode D1 to be conducting. The voltage at point B may thus reach high electrical level rapidly and remain higher than the reference voltage Vth. In such case, the second triggering signal OLT_SD output from the comparator OP1 may keep in high electrical level. As such, the second triggering signal OLT_SD output in the present disclosure may be more stable than the first triggering signal SD output from the optical receiver 210 without being influenced by the reset signal Reset output from the control chip 220.

Further, when the optical network unit ONU 300 stops sending the electrical signal in burst mode to the optical receiver 210, the first triggering signal SD output from the optical receiver 210 may turn to low electrical level from high electrical level and allow the diode D1 to be reversely biased. In such case, the slowly discharging of the first capacitor C2 may allow the voltage at point B to drop to low electrical level from the high electrical level slowly until it is smaller than the reference voltage Vth of the comparator OP1, as shown by FIG. 3. And, when the voltage at point B is lower than the reference voltage Vth, the second triggering signal OLT_SD output from the comparator OP1 may turn to low electrical level from high electrical level.

According to an example of the present disclosure, an appropriate reference voltage Vth may be set by combing consideration of the stability of the second triggering signal OLT_SD and its responsive time. In other words, the reference voltage Vth can't be too high to influence the stability of the second triggering signal output from the comparator OP1. At the same time, the reference voltage Vth can't be too low to influence the utilization of the system bandwidth due to the slow responsive time of the second triggering signal OLT_SD. For example, in case that the first triggering signal SD is at TTL electrical level, the high electrical level of the first triggering signal SD may be about 3.3V. The reference voltage Vth may be set at about VCC/3 in this case.

Moreover, as shown in FIG. 4, the reference voltage Vth input into comparator OP1 may be obtained by sampling the voltage at the common connecting point of a first divider resistor R3 and a second divider resistor R4 connected in series with each other. For example, the first divider resistor R3 and the second divider resistor R4 connected in series with each other is connected in series between the positive voltage input end VCC and the ground, and an appropriate reference voltage Vth may be set by setting the resistance of the first divider resistor R3 and the second divider resistor R4.

As summarized above, the diode D1 may be conducting or positively biased and thus charge the first capacitor C2 by inputting the first triggering signal SD output from the optical receiver 210 into the diode D1 and when the first triggering signal SD is at a high electrical level. When the voltage difference between the two ends of the first capacitor C2 that is input into one input end of the comparator OP1 is larger than the reference voltage Vth input to another input end of the comparator OP1, the second triggering signal OLT_SD output from the output end of the comparator OP1 may be at a high electrical level. When the first triggering signal SD is at a low electrical level, the diode D1 may be reversely biased and the first capacitor C2 may discharge slowly through the first resistor R2. Thus, the voltage difference between the two ends of the first capacitor C2 remains larger than the reference voltage Vth before the first triggering signal SD turns to high electrical level again, i.e. before ending of the reset signal Reset, by setting an appropriate reference voltage Vth. As such the second triggering signal OLT_SD output from the comparator OP1 may remain at high electrical level. Thus, since the second triggering signal OLT_SD may be viewed as slowing down the falling edge of the first triggering signal SD, the stability of the second triggering signal will hardly be influenced by the reset signal Reset. In other words, slowing of the first triggering signal SD is achieved by utilizing additional circuits comprising a diode D1, a comparator OP1 and a first capacitor C2, etc., and the stability of the second triggering signal OLT_SD input into control chip 220 may be effectively improved, enhancing the stability of the whole system may.

For simplicity and illustrative purposes, the present disclosure is described by referring mainly to an example thereof. In the above description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "comprises" means comprises but not limited to, the term "comprising" means comprising but not limited to, and the term "based on" means based at least in part on.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An optical module comprising:
   an optical receiver configured to generate and output a first triggering signal in response to a receipt of a burst mode optical signal;
   a diode comprising an anode connected electrically with an output end of the optical receiver to receive the first triggering signal;
   a first capacitor comprising a first end connected electrically with a cathode of the diode and a second end connected with a ground;
   a first resistor connected between the two ends of the first capacitor;
   a comparator comprising a first input end connected electrically to a pre-set reference voltage, a second input end connected electrically with the cathode of the diode, and an output end for outputting a second triggering signal; and
   a control chip connected electrically with the optical receiver for generating a reset signal in response to a receipt of the second triggering signal and input the reset signal into the optical receiver.

2. The optical module according to claim 1 further comprising a first divider resistor and a second divider resistor, wherein:
   the first divider resistor and the second divider resistor are connected in series between a positive voltage input end and the ground,
   the pre-set reference voltage is derived from a voltage between the first divider resistor and the second divider resistor.

3. The optical module according to claim 2, wherein the pre-set reference voltage is configured to be ⅓ of the positive voltage.

4. The optical module according to claim 1, wherein a voltage difference between the two ends of the first capacitor is configured to be larger than the reference voltage during the reset signal inputting into the optical receiver.

5. The optical module according to claim 1, wherein the comparator is configured to:
   output the second triggering signal at a first electrical level when the reference voltage is smaller than the voltage difference between the two ends of the first capacitor;
   output the second triggering signal at a second electrical level when the reference voltage is larger than the voltage difference between the two ends of the first capacitor.

6. The optical module according to claim 1, wherein the diode is configured to
   be positively biased and to charge the first capacitor when the first triggering signal is at a first electrical level;
   be reversely biased and to discharge the first capacitor when the first triggering signal is at a second electrical level.

7. The optical module according to claim 1, wherein the control chip is configured to generate the reset signal when the second triggering signal comprises a rising edge.

8. The optical module according to claim 1 further comprising a second resistor to be connected across both ends of the diode.

9. The optical module according to claim 1, wherein the optical receiver comprises an optical detection unit, a coupling circuit and a limiting amplifier connected electrically in series, and wherein the reset signal from the control chip is input into the limiting amplifier to discharge the coupling circuit.

10. The optical module according to claim 9, wherein the coupling circuit comprising a coupling capacitor.

11. The optical module according to claim 9, wherein the optical receiver further comprising a logic circuit, and
    wherein the reset signal is input into the limiting amplifier through the logic circuit.

* * * * *